3,431,123
WATERLESS MOLDING SAND
Arthur H. Zrimsek and George J. Vingas, Rolling Meadows, Ill., assignors to Dresser Industries, Inc., Dallas, Tex., a corporation of Delaware
No Drawing. Continuation-in-part of application Ser. No. 508,851, Nov. 19, 1965. This application Feb. 27, 1968, Ser. No. 708,523
U.S. Cl. 106—38.35    8 Claims
Int. Cl. B28b 7/34

ABSTRACT OF THE DISCLOSURE

An improved molding sand composition is made up of silica sand, a clay such as bentonite and ethylene oxide adduct of nonylphenol, dinonylphenol, octylphenol or castor oil.

---

This application is a continuation-in-part of our co-pending application Ser. No. 508,851, filed Nov. 19, 1965 now abandoned.

In preparing sand molds for casting metals it is common practice to bond the sand with small amounts of clay moistened with water. The clay may be one which naturally occurs in the sand used for making molds but is usually a specially selected clay added to sand which has been washed free from clay or other contaminating material. The composition and use of molding sands are described in U.S. Navy Bureau of Ships, "Foundry Manual" Bulletin Number Navships 250–0334, Washington, D.C.; and Metal Castings by Harry L. Camel, New York (1936) and in many other volumes.

In preparing molding sands of desired compressive strength, toughness, permeability and plasticity, many problems arise. Slight variations in moisture content may cause radical changes in the properties of molds prepared from mixtures containing sand and clay. Evaporation of water from conventional sands during working and storage and pouring may cause defects in molds, and cores and result in many defective castings.

Permeability of molds to gas and water vapor generated during the pouring process is a function of pore diameter which in turn is a function of average sand particle size. This fact results in a definite lower limit in the fineness of sand which can be used when large quantities of water vapor are generated during the pouring step, and as a result it is often impossible to use a very fine sand which would give a desired finish to surfaces on a cast metal object.

In order to avoid these disadvantages and others many formulae for water free molding sands have been suggested. It is usual for waterless moldings sands to be bonded by oil. Since oil boils at a higher temperature than water and evolves less gas, finer sands can be used than when water is present to perform the bonding function. The oil, however, is subject to certain disadvantages for it frequently introduces carbon into locations where it is not wanted, results in smoke and objectionable fumes during the casting process and has other disadvantages.

It is an object of the present invention to provide a waterless molding sand in which the use of oil may be avoided or minimized.

Another object is to provide a molding sand containing novel organic bonding agents.

It is another object to provide a waterless molding sand which has greater plasticity, toughness and green strength than sands containing water.

Another object is to provide a waterless moulding sand in which an organic bonding agent does not polymerize and solidify on heating.

Another object is to provide a waterless moulding sand which does not require the use of special organophyllic clays.

Still another object is to provide a waterless molding sand of the above type which is compatible with dry additives normally used in foundries, such as sea coal, silica flour, wood flour, iron oxide, sulfur, etc., or other liquid additions such as small amounts of oil, alcohol, benzene, chlorinated paraffins, etc., in which these additives may be used to obtain their normal effect in altering the molding characteristics of the sand and surface quality of castings.

Still another object is to provide an improved waterless molding sand which is compatible with a wide variety of foundry clays including western and southern bentonite, attapulgite, fire clay, etc.

Another object is to provide an improved molding sand which requires no oil, no catalyst and no dry additive other than clay for development of toughness, and plasticity, and green strength.

Another object is to provide an improved waterless molding sand which can be used repeatedly with only aeration between cycles and periodic reactivation.

Other objects and advantages will become apparent to those skilled in the art from consideration of the description set forth below.

We have found that certain surfactants may be incorporated in a mixture of sand and any type of clay normally used in molding sand compositions to produce a molding sand of excellent green strength, toughness, and plasticity without the use of water or large quantities of oil. These molding sand compositions are further compatible with the usual materials added for control of properties of molds and thus provide a very simple and easy method for preparing the molding sands.

The surfactants may be incorporated in the sand clay mixture by mulling or by any other method of intimately mixing them with sand and clay as desired. We have found further that the surfactants are compatible with water and oil if these are already present in the sand and clay, or are added either accidentally or deliberately. The waterless molding sand compositions of the present invention comprise about 100 parts of sand, preferably a well washed silica sand; about 1½ to 8 parts of clay, preferably selected from the group consisting of bentonite, attapulgite, fire clay, kaolin and mixtures thereof; and about 3 to 5 parts of surfactant material.

The preferred surfactants for use in the present invention are ethylene oxide adducts of nonylphenol and dinonylphenol made by reacting each mol of the corresponding phenol with from 4 to 10 mols of ethylene oxide, octylphenol made by reacting each mol of octylphenol with from 4–12 mols of ethylene oxide, and castor oil made by reacting the castor oil with from 12 to 50 weight percent of ethylene oxide. The greatest effect is obtained when ethylene oxide is used in producing the adduct in such quantity that solubility characteristics of the resulting adduct are substantially on a borderline between oil solubility and water solubility. The proportions of surfactant used in the composition will vary according to the type of clay included in the mixture. For example, when the clay is bentonite, the sufactant in proportion to about 1 to 1 with clay usually gives an excellent molding sand composition while if the clay used is attapulgite it should be used in proportions of about 1½ parts per part of adduct, and when fire clay is used about 2 parts of clay to 1 part adduct gives the best result.

While, as stated above, the usual proportion of surfactant used per 100 parts of sand should be at least 1½ parts per 100 parts of sand. The upper limit of 8% stated above is not critical and is used merely because proportions of surfactant in excess of 8% give substantially no desirable increase in strength, toughness or plasticity of the sand and is set merely by economic limits as it is obviously wasteful to include more surfactant than is required to give the desired properties to the sand composition. Up to 30% surfactant may be used in naturally bonded sands without which contain clay of the natural kaolin type. When clays of this general type are used it is preferred that the surfactant be used in proportions of about 10% of the natural clay content of the sand, or for purposes of economy about 5% of the surfactant and 5% of oil may be substituted for the 10% surfactant.

A mixture of these surfactants with oils in ratios of about 1 to 1 often is usable but results in a molding sand having about 15% less strength than a sand in which the oil is omitted. Since foundry practices vary, it may often be desirable to use the surfactant and oil in such proportions when the small increase in strength is immaterial.

The surfactant also may be used with water in proportion of about 2 parts surfactant to 1 part of water to give a molding sand composition of usable strength. The surfactants of this invention apparently activate the clay to form gels without the necessity for the presence of either water or oil but are compatible with either water or oil. This unexpected result is believed to be new and unprecedented in the literature.

The surfactants of the present invention also may be used to convert any waterless molding sand in present use to a new waterless system and such conversion of molding sand usually results in a noticeable saving in sand costs. This is due to the fact that these surfactants are versatile and compatible with other waterless binders.

The conversion to a system employing the present surfactants is simple. When a heap of sand requires reactivation, bentonite or other clay may be substituted for the organophyllic clay or other waterless binder being used, and the present surfactants or a mixture of the present surfactants and oil may be substituted for the conventional oil addition. Both additions should be reduced by about 25% from the quantities required for reactivation by other binders. In other words, if present additions are 1 pound of waterless binder and 1 pound of oil per 100 pounds of used sand only about ¾ pound of bentonite and ¾ pound of the present surfactants, or a mixture of the present surfactants and oil, should be used.

Molding sands including the present surfactants may be used over and over again with only aeration between cycles and periodic reactivation with the surfactant, or the mixture of a surfactant and oil, and clay. A number of methods may be employed to reactivate the system. After each pour, about 1/10% bentonite and 1/10% of surfactant or 1/10% of a mixture of the surfactant and the oil may be sprinkled on the heap of used sand before aeration.

Another method which can be used is to periodically blend mulled mixtures of new sand, clay, and the present surfactants into the heap of used sand before it is aerated. This method also can be employed when new sand facings are used.

Frequently the most economical method for reactivating the heap of used sand is periodic remulling of the sand with the addition of about ½% bentonite or other clay and ½% surfactant or surfactant-oil mixture. Reactivation in this manner usually requires much shorter mulling times than those required for new sand mixtures.

As with most sand systems better results are obtained with new sand mixtures than with the reused sands. For most applications, however, reused or heap sand kept in proper condition is quite satisfactory for most purposes. When a smooth surface is required for high quality castings the common practice of using a mold made with re-used sand and faced with new facing sand composition can be used by reactivating the used sand with surfactant and clay and preparing new facing sand, each as described above.

The strength level of the sand composition will generally be dictated by the personal experience of the individual foundryman. The sand quality, however, should be governed by moldability and casting quality. Because the surfactants of the present invention impart excellent toughness to the sand, lower strength levels than normally required can be used. The strength actually needed will depend on the quality, size and configuration of pattern equipment. With simple match plate work, sands with strengths as low as 3.0 to 3.5 p.s.i. can produce excellent molds. For larger molds or loose pattern work, the foundryman will probably prefer stronger, tougher sands. The following formulae are given to illustrate variation in strength of various mixtures made with one of the preferred surfactants of the present invention.

Example I

| | Pounds |
|---|---|
| Dry silica sand | 100 |
| Western bentonite | 3 |
| Nonylphenol adducted with 10 mols of ethylene oxide per mol of nonylphenol | 3 |

This mixture results in a mold having green strength of about 6.0 to 7.5 pounds p.s.i., and a green shear strength of 2.0 to 2.5 p.s.i.

Example II

| | Pounds |
|---|---|
| Dry silica sand | 100 |
| Western bentonite | 4 |
| Nonylphenol adducted with 10 mols of ethylene oxide per mol of nonylphenol | 4 |

This mixture results in green compression strength of about 8.0 to 10.0 p.s.i., and green shear strength of about 2.7 to 3.5 p.s.i.

Example III

| | Pounds |
|---|---|
| Dry silica sand | 100 |
| Western bentonite | 4 |
| Nonylphenol adducted with 10 mols of ethylene oxide per mol of nonylphenol | 2 |
| Motor oil | 2 |

A mixture of this composition results in a molding sand having green compression strength of about 6.0 to 7.5 p.s.i., and green shear strength of about 1.8 to 2.3 p.s.i.

The strongest, toughest sands produced with the surfactants of the present invention are made with western bentonite as the clay bonding material. The higher the bentonite content, the higher the strength and toughness.

As a general rule the surfactants of the present invention and bentonite should be added in about equal proportions with about 4% of each being the upper limit normally required. A stronger but more brittle sand can be produced by proportion of surfactant in the sand to about ¾ of that of bentonite. Toughness can also be reduced at some expense of strength by reducing the mulling time or by additions of silica flour or iron oxide.

Any of the clays normally used in molding sand compositions may be used to replace western bentonite as the bonding material. Attapulgite for example, together with a surfactant of the present invention will produce molding sand compositions of high strength and moderate toughness. Southern bentonite and fire clay will produce sands of moderate to low strength and low toughness. The preferred content of clay in the mixture will be about 3 to 4% for attapulgie, about 4 to 5% for southern bentonite and about 6 to 8% for fire clay. Thus by selecting the clay for bonding material, varying the quantity of clay within the above limits and the proportions of the surfactant the foundryman may produce a molding sand composition having substantially whatever properties he may require for any particular job.

Mulling procedures which are satisfacory for conventional green sands can be used in incorporating the surfactants of the present invention into the sand composition. The time of mulling used will depend somewhat upon the type of muller. Sand compositions in which the present surfactants are incorporated, when mulled in vertical wheel mullers, will develop about 80% of their potential strength level in from 6 to 10 minutes. The materials in the composition may be added in any order desired but slightly faster mulling response is obtained by adding the surfactants to the sand, mulling for about fifteen seconds or so, followed by the addition of the clay, and other dry additives if used, and continuing mulling until thorough incorporation of all added materials with the sand is obtained.

Many tests were made on compositions containing various surfactants and in which clays were used in the range from 1½ to 8 parts of clay per 100 parts of sand and the surfactant material was varied from about 2 to 5 parts per 100 parts of sand. It was found that the surfactants giving very high degrees of strength, toughness and plasticity were ethylene oxide adducts of nonylphenol, dinonylphenol, adducted with from about 4 to 10 mols of ethylene oxide for each mol of the phenol and octylphenol adducted with about 4 to 12 mols ethylene oxide for each mol of the phenol and castor oil adducted with about 30 to 50% of its weight of ethylene oxide. The highest mold qualities were obtained by use of these same nonylphenols, dinonylphenols, octylphenol and castor oil adducted with ethylene oxide in quantities required to render the resulting adducts substantially equally soluble in water and in oil. Bentonite was found to give higher strength and toughness than attapulgite, fire clay or kaolin.

The embodiments of the invention in which an exclusive property or privilege is claimed are defined as follows:

1. An improved waterless molding sand consisting essentially of:
   (A) about 100 parts by weight of sand;
   (B) about 1.5 to 8 parts by weight of molding sand bonding clay, and
   (C) about 2 to 5 parts by weight of a surfactant selected from the group consisting of ethylene oxide adducts of
   (1) nonylphenol
   (2) dinonylphenol
   (3) octylphenol and
   (4) castor oil wherein the adducts of nonylphenol and dinonylphenol each contain from about 4 to 10 mols of ethylene oxide per mol of nonylphenol or dinonylphenol, respectively, the adduct of octylphenol contains from about 4 to 12 mols of ethylene oxide per mol of octylphenol, and the adduct of castor oil contains from about 12 to about 50 weight percent ethylene oxide.

2. The composition of claim 1 wherein said surfactant is nonylphenol adducted with from about 4 to 10 mols of ethylene oxide per mol of nonylphenol.

3. The composition of claim 1 wherein said surfactant is dinonylphenol adducted with from about 4 to 10 mols of ethylene oxide per mol of dinonylphenol.

4. The composition of claim 1 wherein said surfactant is octylphenol adducted with about 4 to 12 mols of ethylene oxide per mol of octylphenol.

5. The composition of claim 1 wherein said surfactant is castor oil adducted with about 30% to about 50% of its weight of ethylene oxide.

6. The composition of claim 1 wherein said clay is bentonite.

7. The composition of claim 1 wherein said sand is silica sand.

8. The composition of claim 1 wherein said clay is one of bentonite, attapulgite, fire clay, kaolin, and mixtures thereof.

References Cited

UNITED STATES PATENTS

| | | | |
|---|---|---|---|
| 2,888,354 | 5/1959 | Smith et al. | |
| 2,977,237 | 3/1961 | Vierk et al. | 106—38.25 |
| 3,027,265 | 3/1962 | Miericke. | |
| 3,069,361 | 12/1962 | Cogswell | 252—363.5 |
| 3,212,144 | 10/1965 | Capps. | |
| 3,278,316 | 10/1966 | Sawyer | 106—38.35 XR |

JULIUS FROME, *Primary Examiner.*

L. HAYES, *Assistant Examiner.*

U.S. Cl. X.R.

106—38.3, 38.7, 69, 71